US008300450B2

(12) United States Patent
Christensen et al.

(10) Patent No.: US 8,300,450 B2
(45) Date of Patent: Oct. 30, 2012

(54) IMPLEMENTING PHYSICALLY UNCLONABLE FUNCTION (PUF) UTILIZING EDRAM MEMORY CELL CAPACITANCE VARIATION

(75) Inventors: Todd Alan Christensen, Rochester, MN (US); John Edwards Sheets, II, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/938,477

(22) Filed: Nov. 3, 2010

(65) Prior Publication Data
US 2012/0106235 A1 May 3, 2012

(51) Int. Cl.
*G11C 11/24* (2006.01)
(52) U.S. Cl. .................. 365/149; 365/102
(58) Field of Classification Search .............. 365/149, 365/102
See application file for complete search history.

(56) References Cited

U.S. PATENT DOCUMENTS
8,164,942 B2 * 4/2012 Gebara et al. ............ 365/149

OTHER PUBLICATIONS

"Physical Unclonable Function", http://en.wikipedia.org/wiki/Physically_unclonable[13] function.

* cited by examiner

Primary Examiner — Son Dinh
Assistant Examiner — Nam Nguyen
(74) Attorney, Agent, or Firm — Joan Pennington

(57) ABSTRACT

A method and embedded dynamic random access memory (EDRAM) circuit for implementing a physically unclonable function (PUF), and a design structure on which the subject circuit resides are provided. An embedded dynamic random access memory (EDRAM) circuit includes a first EDRAM memory cell including a memory cell true storage capacitor and a second EDRAM memory cell including a memory cell complement storage capacitor. The memory cell true storage capacitor and the memory cell complement storage capacitor include, for example, trench capacitors or metal insulator metal capacitors (MIM caps). A random variation of memory cell capacitance is used to implement the physically unclonable function. Each memory cell is connected to differential inputs to a sense amplifier. The first and second EDRAM memory cells are written to zero and then the first and second EDRAM memory cells are differentially sensed and the difference is amplified to consistently read the same random data.

20 Claims, 4 Drawing Sheets

IMPLEMENTING PHYSICALLY UNCLONABLE FUNCTION (PUF) UTILIZING EDRAM MEMORY CELL CAPACITANCE VARIATION

FIELD OF THE INVENTION

The present invention relates generally to the data processing field, and more particularly, relates to a method and circuit for implementing a Physically Unclonable Function (PUF) utilizing embedded dynamic random access memory (EDRAM) memory cell capacitance variation, and a design structure on which the subject circuit resides.

DESCRIPTION OF THE RELATED ART

Typically embedded dynamic random access memory (EDRAM) is integrated on a same die or in a same package as a main application specific integrated circuit (ASIC) or main processor.

A physical unclonable function (PUF) is a function that is embodied in a physical structure and is easy to evaluate but hard to predict. An individual PUF device must be easy to make but practically impossible to duplicate, even given the exact manufacturing process that produced it. In this respect physical unclonable functions (PUF), which are the hardware analog of a one-way function, or essentially random functions bound to a physical device in such a way that it is computationally and physically infeasible to predict the output of the function without actually evaluating it using the physical device.

A need exists for a circuit having an efficient and effective mechanism for implementing physical unclonable functions (PUF).

SUMMARY OF THE INVENTION

Principal aspects of the present invention are to provide a method and circuit for implementing a Physically Unclonable Function (PUF) utilizing embedded dynamic random access memory (EDRAM) memory cell capacitance variation, and a design structure on which the subject circuit resides. Other important aspects of the present invention are to provide such method, circuit and design structure substantially without negative effects and that overcome many of the disadvantages of prior art arrangements.

In brief, a method and embedded dynamic random access memory (EDRAM) circuit for implementing a physically unclonable function (PUF), and a design structure on which the subject circuit resides are provided. An embedded dynamic random access memory (EDRAM) circuit includes a first EDRAM memory cell including a memory cell true storage capacitor and a second EDRAM memory cell including a memory cell complement storage capacitor. The memory cell true storage capacitor and the memory cell complement storage capacitor include, for example, trench capacitors or metal insulator metal capacitors (MIM caps). A random variation of memory cell capacitance is used to implement the physically unclonable function. Each memory cell is connected to differential inputs to a sense amplifier. The first and second EDRAM memory cells are written to zero (0) and then the pair of cells is differentially sensed and the difference is amplified to consistently read the same random data.

In accordance with features of the invention, along with memory cell capacitance variation due to manufacturing and process variations in the EDRAM capacitor, there is a timing dependence based upon the EDRAM trench capacitor in which its capacitance increases after it is written and also there is increased variation in this capacitance until it reaches its DC or steady state capacitance. It is during the time of maximum variation that the EDRAM cell is read.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and embedded dynamic random access memory (EDRAM) circuit for implementing a Physically Unclonable Function (PUF) utilizing embedded dynamic random access memory (EDRAM) memory cell capacitance variation, and a design structure on which the subject circuit resides are provided.

Figure 1:
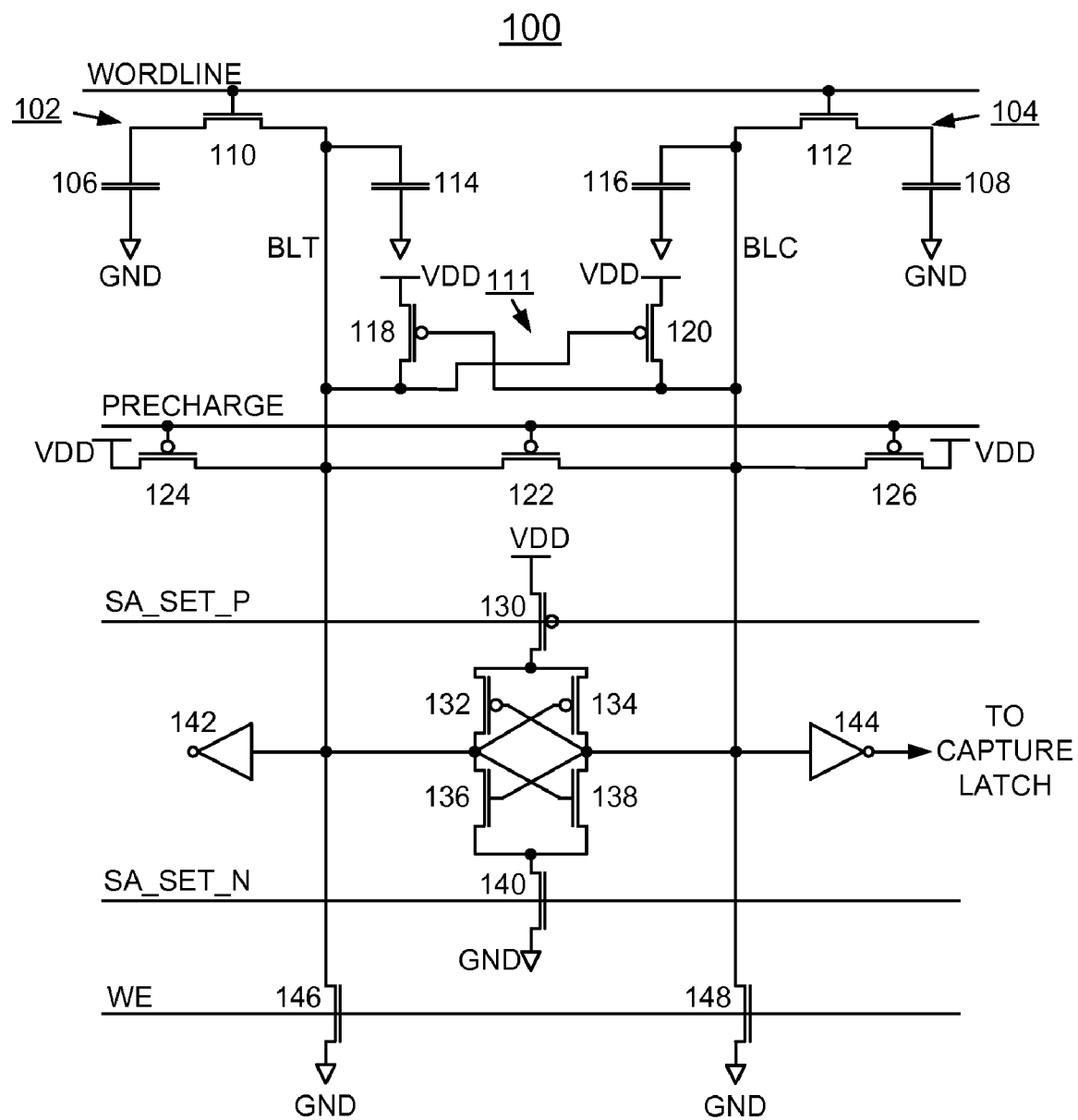
FIG. 1 is a schematic diagram illustrating an example circuit for implementing a Physically Unclonable Function (PUF) utilizing embedded dynamic random access memory (EDRAM) memory cell capacitance variation in accordance with the preferred embodiment.

Having reference now to the drawings, in FIG. 1, there is shown an example embedded dynamic random access memory (EDRAM) circuit for implementing a Physically Unclonable Function (PUF) utilizing EDRAM memory cell capacitance variation generally designated by the reference character 100 in accordance with the preferred embodiment.

EDRAM circuit 100 includes a first EDRAM memory cell 102 and a second EDRAM memory cell 104 respectively including a memory cell true storage capacitor 106 and a memory cell complement storage capacitor 108. The memory cell true storage capacitor 106 and the memory cell complement storage capacitor 108 include, for example, trench capacitors or metal insulator metal capacitors (MIM caps). EDRAM memory cells 102 and 104 including capacitors 106, 108 have a significant variation in capacitance. This capacitance variation generally due to manufacturing and process variations in the EDRAM memory cell storage capacitors 106, 108 is also affected by the timing relationships between being written and being read. In the novel EDRAM circuit 100 this variation is exploited to create a Physically Unclonable Function or PUF.

In accordance with features of the invention, a random variation of memory cell capacitance of the memory cell storage capacitors 106, 108 is used to implement the physically unclonable function. Each memory cell 102, 104 is connected to differential inputs to a sense amplifier 111.

Each memory cell 102, 104 includes a respective control transistor or access N-channel field effect transistor (NFET) 110, 112 controlled by a select signal or wordline, which connects one side of the respective storage capacitor 106, 108 to a data line or bitline. A gate of control or access NFETs 110, 112 is connected to a wordline WL of the cells 102, 104. The NFETs 110, 112 are connected between the respective memory cell storage capacitors 106, 108 and a respective bitline true BLT and bitline complement BLC.

On both the bitline true BLT and bitline complement BLC, there is parasitic capacitance or capacitors 114, 116 that is made up mainly of the wiring capacitance and the device capacitance of the transistors connected to them. The layout of the wires and transistors is done in such a way to make this parasitic capacitance equal between the parasitic capacitance 114, 116.

EDRAM circuit 100 includes a pair of P-channel field effect transistors (PFETs) 118, 120, each PFET 118, 120 is connected between a voltage supply line VDD and the respective bitline true BLT and bitline complement BLC. A gate of the respective PFET 118, 120 is connected to the bitline complement BLC and bitline true BLT. EDRAM circuit 100 includes a plurality of P-channel field effect transistors (PFETs) 122, 124, 126. A gate of each of the PFETs 122, 124, 126 is connected to a precharge signal line. PFET 122 is connected between the bitline true BLT and bitline complement BLC. The precharge PFETs 124, 126 are connected between the voltage supply line VDD and the respective bitline true BLT and bitline complement BLC.

EDRAM circuit 100 includes six-device sense amplifier of a plurality of PFETs 130, 132, 134, and a plurality of NFETs 136, 138, 140 connected to the bitline true BLT and bitline complement BLC. A pair of inverters is formed by PFET 132 and NFET 136 and PFET 134 and NFET 138 and connected by PFET 130 to the voltage supply rail VDD and connected by NFET 140 to ground GND. The true bitline BLT is connected to the drain and source connection of inverter PFET 132 and NFET 136 and to the gate input to the inverter PFET 134 and NFET 138. The compliment bitline BLC is connected to the drain and source connection of PFET 134 and NFET 138 and to the gate input to the inverter PFET 132 and NFET 136. A gate of the PFET 130 is connected to a sense amplifier set signal SA_SET_P and a gate of NFET 140 connected to a sense amplifier set signal SA_SET_N. A pair of inverters 142, 144 is connected to the bitline true BLT and bitline complement BLC, with inverter 144 providing an input to a capture latch (not shown) and inverter 142 provided for balance in the sense amplifier. A respective NFET 146, 148 is connected between the bitline true BLT and bitline complement BLC to ground. A gate of the NFETs 146, 148 is connected to a write enable signal WE.

In accordance with features of the invention, EDRAM circuit 100 uses the capacitance variation of storage capacitors 106, 108 to create a Physically Unclonable Function or PUF. A timing dependence is based upon the EDRAM capacitor 106, 108, where capacitance increases after it is written and also there is increased variation in this capacitance until it reaches its DC or steady state capacitance. It is during this time of maximum variation that the EDRAM cell should be read. The first and second EDRAM memory cells 102, 104 are written to zero (0) and then the pair of cells is differentially sensed and the difference is amplified to consistently read the same random data.

Figure 2:
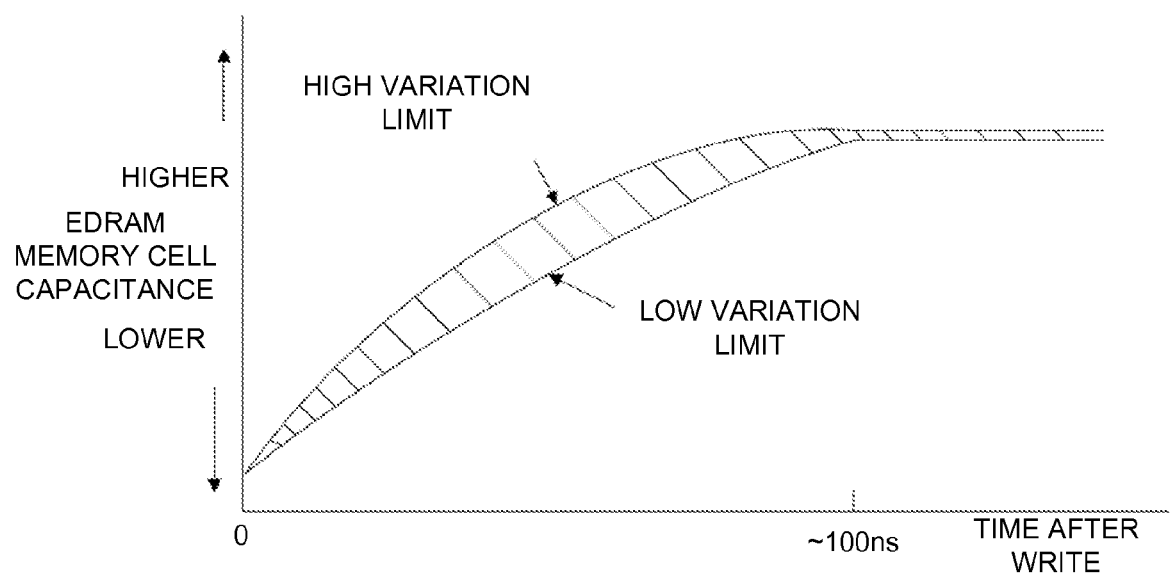
FIG. 2 is a chart illustrating an example variation limit with capacitance illustrated with respect to a vertical axis and time after write illustrated with respect to a horizontal axis in accordance with the preferred embodiment.

FIG. 2 illustrates example high variation limit and low variation limit with EDRAM memory cell capacitance illustrated with respect to a vertical axis and time after write illustrated with respect to a horizontal axis in accordance with the preferred embodiment.

Figure 3:
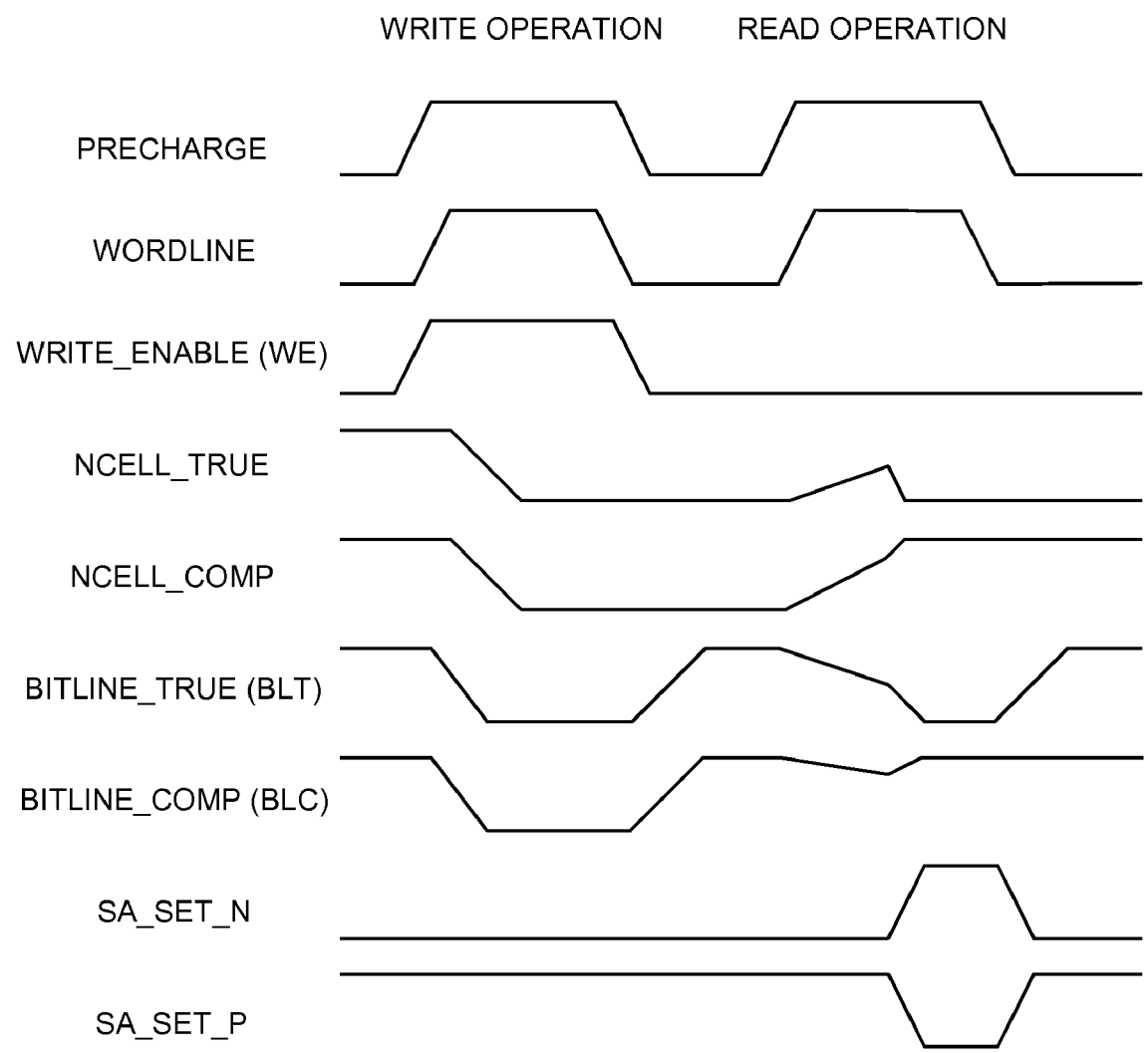
FIG. 3 are example waveforms illustrating example operation of the circuit of FIG. 1 for implementing a Physically Unclonable Function (PUF) utilizing embedded dynamic random access memory (EDRAM) memory cell capacitance variation in accordance with the preferred embodiment.

Referring to FIG. 3, there are shown example waveforms illustrating example operation of the EDRAM circuit 100 for implementing a Physically Unclonable Function (PUF) utilizing embedded dynamic random access memory (EDRAM) memory cell capacitance variation.

Operation of the EDRAM circuit 100 in accordance with the preferred embodiment may be understood as follows. After precharging the local bitlines, bitline true BLT and bitline complement BLC to high or the supply line Vdd, the PRECHARGE, Write enable WE and the WORDLINE signals all are driven high. This write operation writes the first and second EDRAM memory cells 102, 104 to zero (0). EDRAM memory cells 102, 104 both contain 0 or ground across their storage capacitors 106, 108, as indicated at lines NCELL_TRUE, NCELL_COMP.

Next the PRECHARGE, Write enable WE and the WORDLINE signals all transition low and the EDRAM enters the precharge phase. The read operation after the write is provided after waiting until the time dependence capacitance variation is near its peak, and then EDRAM is read.

For the read operation, the PRECHARGE, and the WORDLINE signals transition high. Since the voltage on EDRAM memory cell storage capacitors 106, 108, as indicated at lines NCELL_TRUE, NCELL_COMP is 0 and the voltage of parasitic capacitance or capacitors 114, 116 is the voltage supply Vdd, charge redistribution begins to occur with charge moving from the respective bitline true BLT and bitline complement BLC into the EDRAM storage capacitor 106, 108 thus dropping the voltage on the respective bitline true BLT and bitline complement BLC below Vdd.

In the example waveforms, the capacitance on memory cell storage capacitor 106 is larger due to variation than memory cell storage capacitors 108. Thus more charge will flow from bitline true BLT onto memory cell 102 than on the compliment side from bitline complement BLC onto memory cell 104. This results in a lower voltage on bitline true BLT than on bitline complement BLC.

As shown, after a sufficient time to allow the charge redistribution to occur, the sense amplifier now is used. Sense amplifier set signals SA_SET_N and SA_SET_P transition from their off state to their on state. Setting of the sense amplifier will now amplify this differential in voltage between bitline true BLT and bitline complement BLC. Bitline true BLT will be amplified to 0 bitline complement BLC will be amplified to 1. Connected to the sense amplifier by the inverter 144 is a capture latch that will capture and hold the sensed data indefinitely.

If EDRAM storage capacitor 108 is larger than EDRAM storage capacitor 106, then the opposite occurs and the opposite data will be amplified and captured in the operation of the EDRAM circuit 100.

Figure 4:
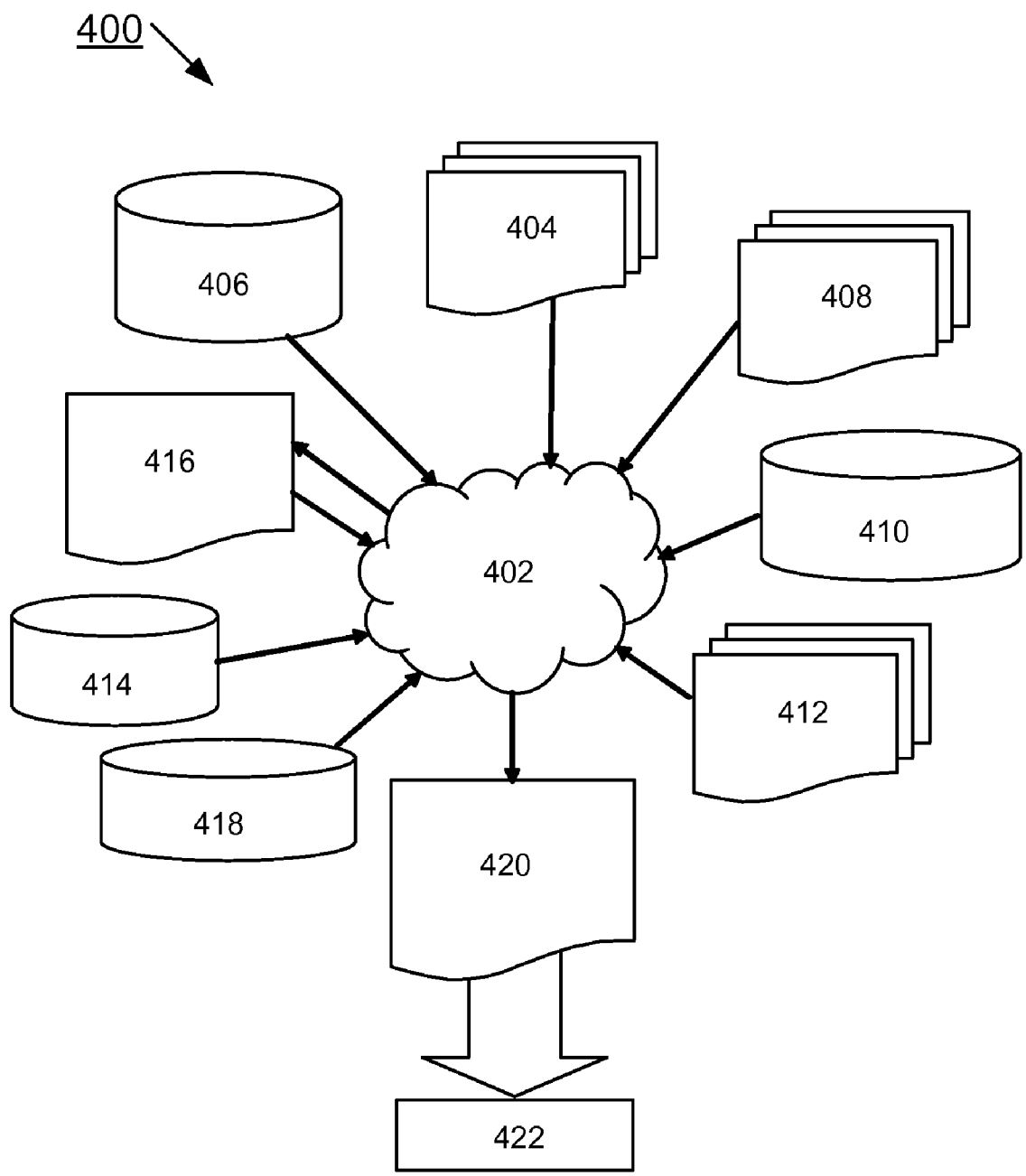
FIG. 4 is a flow diagram of a design process used in semiconductor design, manufacturing, and/or test.

FIG. 4 is a flow diagram of a design process used in semiconductor design, manufacturing, and/or test. FIG. 4 shows a block diagram of an example design flow 400. Design flow 400 may vary depending on the type of IC being designed. For example, a design flow 400 for building an application specific IC (ASIC) may differ from a design flow 400 for designing a standard component. Design structure 402 is preferably an input to a design process 404 and may come from an IP provider, a core developer, or other design company or may be generated by the operator of the design flow, or from other sources. Design structure 402 comprises circuit 100 in the form of schematics or HDL, a hardware-description language, for example, Verilog, VHDL, C, and the like. Design structure 402 may be contained on one or more machine readable medium. For example, design structure 402 may be a text file or a graphical representation of circuit 100. Design process 404 preferably synthesizes, or translates, circuit 100 into a netlist 406, where netlist 406 is, for example, a list of wires, transistors, logic gates, control circuits, I/O, models, etc. that describes the connections to other elements and circuits in an integrated circuit design and recorded on at least one of machine readable medium. This may be an iterative process in which netlist 406 is resynthesized one or more times depending on design specifications and parameters for the circuit.

Design process 404 may include using a variety of inputs; for example, inputs from library elements 404 which may house a set of commonly used elements, circuits, and devices, including models, layouts, and symbolic representations, for a given manufacturing technology, such as different technology nodes, 42 nm, 45 nm, 90 nm, and the like, design specifications 410, characterization data 412, verification data 414, design rules 416, and test data files 418, which may include test patterns and other testing information. Design process 404 may further include, for example, standard circuit design processes such as timing analysis, verification, design rule checking, place and route operations, and the like. One of ordinary skill in the art of integrated circuit design can appreciate the extent of possible electronic design automation tools and applications used in design process 404 without deviating from the scope and spirit of the invention. The design structure of the invention is not limited to any specific design flow.

Design process 404 preferably translates embodiments of the invention as shown in FIG. 1, along with any additional integrated circuit design or data (if applicable), into a second design structure 420. Design structure 420 resides on a storage medium in a data format used for the exchange of layout data of integrated circuits, for example, information stored in a GDSII (GDS2), GL1, OASIS, or any other suitable format for storing such design structures. Design structure 420 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 1. Design structure 420 may then proceed to a stage 422 where, for example, design structure 420 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. An embedded dynamic random access memory (EDRAM) circuit for implementing a physically unclonable function (PUF) comprising:
   a first EDRAM memory cell including a memory cell true storage capacitor;
   a second EDRAM memory cell including a memory cell complement storage capacitor;
   a random variation of memory cell capacitance included in said memory cell true storage capacitor and said memory cell complement storage capacitor being used to implement the physically unclonable function;
   each of said first and second EDRAM memory cells being connected to differential inputs to a sense amplifier; said first and second EDRAM memory cells being written to zero (0) and said first and second EDRAM memory cells being differentially sensed and the difference being amplified to consistently read the same random data.

2. The EDRAM circuit as recited in claim 1 wherein each of said first and second EDRAM memory cells being connected to differential inputs to a sense amplifier includes a respective access N-channel field effect transistor (NFET) controlled by a select wordline signal.

3. The EDRAM circuit as recited in claim 2 wherein each said respective access NFET respectively connects said memory cell true storage capacitor and said memory cell complement storage capacitor to a bitline true BLT and a bitline complement BLC.

4. The EDRAM circuit as recited in claim 3 wherein said bitline true BLT and said bitline complement BLC include substantially equal parasitic capacitance.

5. The EDRAM circuit as recited in claim 3 include a respective write enable transistor connected between said bitline true BLT and said bitline complement BLC and ground, said a respective write enable transistor controlled by a write enable signal.

6. The EDRAM circuit as recited in claim 3 wherein said sense amplifier includes precharge transistors connected to said bitline true BLT and said bitline complement BLC, said precharge transistors controlled by a precharge signal.

7. The EDRAM circuit as recited in claim 1 wherein said sense amplifier includes a pair of cross-coupled inverters connected to both said bitline true BLT and said bitline complement BLC.

8. The EDRAM circuit as recited in claim 3 wherein said sense amplifier includes sense amplifier control transistors connecting said pair of cross-coupled inverters between a voltage supply line and ground, said sense amplifier control transistors include each said sense amplifier control transistors being controlled by a respective sense amplifier set signal.

9. A design structure embodied in a machine readable medium used in a design process, the design structure comprising:
   an embedded dynamic random access memory (EDRAM) circuit tangibly embodied in the machine readable medium used in the design process, said circuit for implementing a physically unclonable function (PUF), said EDRAM circuit comprising:
   a first EDRAM memory cell including a memory cell true storage capacitor;
   a first EDRAM memory cell including a memory cell true storage capacitor;
   a second EDRAM memory cell including a memory cell complement storage capacitor;
   a random variation of memory cell capacitance included in said memory cell true storage capacitor and said memory cell complement storage capacitor being used to implement the physically unclonable function;

each of said first and second EDRAM memory cells being connected to differential inputs to a sense amplifier; said first and second EDRAM memory cells being written to zero (0) and said first and second EDRAM memory cells being differentially sensed and the difference being amplified to consistently read the same random data, wherein the design structure, when read and used in the manufacture of a semiconductor chip produces a chip comprising said circuit.

10. The design structure of claim 9, wherein the design structure comprises a netlist, which describes said EDRAM circuit.

11. The design structure of claim 9, wherein the design structure resides on storage medium as a data format used for the exchange of layout data of integrated circuits.

12. The design structure of claim 9, wherein the design structure includes at least one of test data files, characterization data, verification data, or design specifications.

13. The design structure of claim 9, wherein each of said first and second EDRAM memory cells being connected to differential inputs to a sense amplifier includes a respective access N-channel field effect transistor (NFET) controlled by a select wordline signal.

14. The design structure of claim 13, wherein each said respective access NFET respectively connects said memory cell true storage capacitor and said memory cell complement storage capacitor to a bitline true BLT and a bitline complement BLC.

15. The design structure of claim 13, include a respective write enable transistor connected between said bitline true BLT and said bitline complement BLC and ground, said a respective write enable transistor controlled by a write enable signal.

16. The design structure of claim 13, wherein said sense amplifier includes precharge transistors connected to said bitline true BLT and said bitline complement BLC, said precharge transistors controlled by a precharge signal.

17. The design structure of claim 13, wherein said sense amplifier includes a pair of cross-coupled inverters connected to both said bitline true BLT and said bitline complement BLC; and sense amplifier control transistors connecting said pair of cross-coupled inverters between a voltage supply line and ground, said sense amplifier control transistors include each said sense amplifier control transistors being controlled by a respective sense amplifier set signal.

18. A method for implementing a physically unclonable function (PUF) using an embedded dynamic random access memory (EDRAM) circuit comprising:

providing a memory cell true storage capacitor included in a first EDRAM memory cell;

providing a memory cell complement storage capacitor included in a second EDRAM memory cell;

using a random variation of memory cell capacitance included in said memory cell true storage capacitor and said memory cell complement storage capacitor to implement the physically unclonable function;

connecting each of said first and second EDRAM memory cells to differential inputs to a sense amplifier; writing said first and second EDRAM memory cells to zero and differentially sensing said first and second EDRAM memory cells and amplifying the difference to consistently read the same random data.

19. The method as recited in claim 18 includes providing a respective access N-channel field effect transistor (NFET) controlled by a select wordline signal connecting each of said first and second EDRAM memory cells to differential inputs to a sense amplifier.

20. The method as recited in claim 18 wherein each said respective access NFET respectively connecting said memory cell true storage capacitor and said memory cell complement storage capacitor to a bitline true BLT and a bitline complement BLC.

* * * * *